June 6, 1933.  G. K. McNEILL  1,913,126
VULCANIZING APPARATUS
Filed April 30, 1930
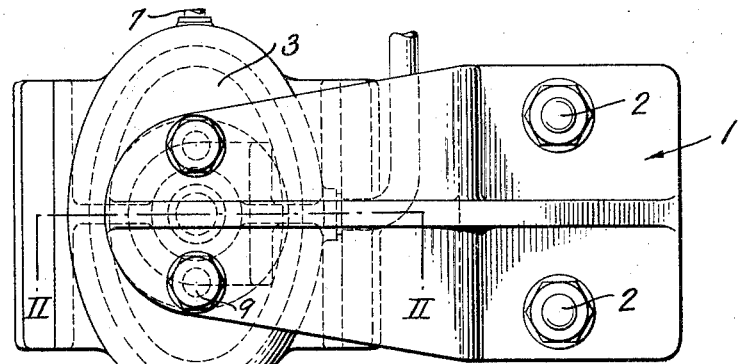
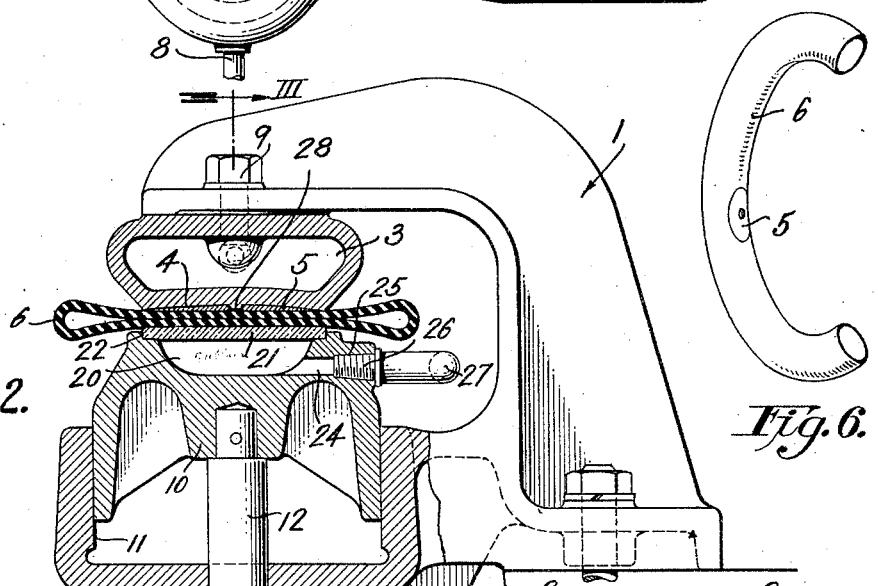
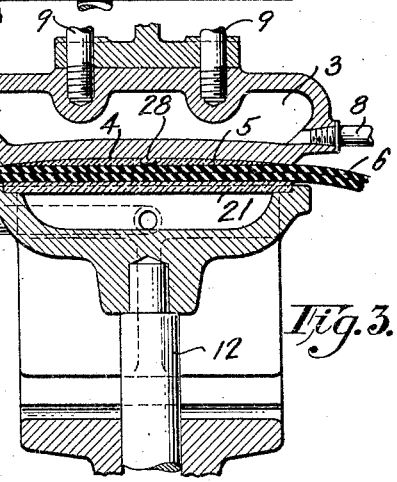
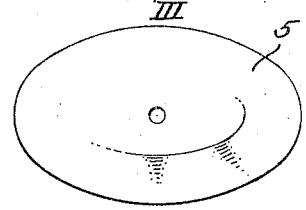
INVENTOR
George K. McNeill
BY
ATTORNEY Patented June 6, 1933

1,913,126

UNITED STATES PATENT OFFICE

GEORGE K. McNEILL, OF DETROIT, MICHIGAN, ASSIGNOR TO MORGAN & WRIGHT, OF DETROIT, MICHIGAN, A CORPORATON OF MICHIGAN

VULCANIZING APPARATUS

Application filed April 30, 1930. Serial No. 448,467.

My invention relates to vulcanizing apparatus and more particularly to apparatus for vulcanizing patches and/or valve bases to rubber bodies.

In vulcanizing small bodies of rubber, such as patches, labels, valve bases and the like, to rubber bodies, it has been customary to support the body on a form or support for applying pressure and heat to the patch and body for joining them. Where a metallic form was used, and particularly where a flat or a substantially flat surface was presented for supporting the body, non-uniformity of pressure was had throughout the area beneath the patch. Also, the absolute pressure per unit of area applied to the vulcanizing operation varied owing to the differences in the mechanical pressure applied by different operators.

I provide a vulcanizing device in which one of the members engaging the patch and/or the material to which it is applied, is made flexible to provide a uniform pressure throughout the area of vulcanization upon the application of fluid under pressure to the opposite surface of the flexible member. The flexible member transmits substantially the same pressure to all parts of the engaging material and the pressure per unit of area is controlled in accordance with the pressure of the fluid applied to the flexible member. If the shape of the heated engaging member is made to substantially conform to the shape of the patch, the area which is affected by the heat of vulcanization is restricted.

The accompanying drawing illustrates a present preferred embodiment of the invention, in which:

Figure 1 is a plan view of a vulcanizing device embodying my invention;

Fig. 2 is a transverse view thereof, partially in elevation and partially in section, taken substantially along the section line II—II of Fig. 1;

Fig. 3 is a longitudinal view thereof, partially in elevation and partially in section, taken substantially along the section line III—III of Fig. 2;

Fig. 4 is a perspective view of a valve base;

Fig. 5 is an edge view thereof; and

Fig. 6 is a perspective view of a portion of a tube with a valve base attached thereto.

Referring to the drawing, a vulcanizing device 1 comprises a bifurcated frame which is adapted to be secured to a bench or the like by bolts 2. The upper arm of the frame carries an oval shaped heating chamber or steam chest 3 which is made hollow for the passage of a heating medium. The lower face 4 of the chamber 3 is shaped to conform to the shape of a body 5 which is to be attached to a rubber or other article 6. The body 5 is illustrated in the form of a valve base although it is to be understood that the apparatus is suitable for applying patches, labels and the like to different bodies. The article 6 is illustrated in the form of an inner tube although it is to be understood that the invention is not limited to such articles. A heating medium, such as steam, is supplied to the heating chamber 3 through an inlet pipe 7 and withdrawn through outlet pipe 8. Preferably, the outlet pipe 8 is placed near the bottom of a heating chamber 3 for permitting the escape of condensate. It is to be understood that either or both of the pipe lines 7 or 8 may be controlled by valve mechanisms (not shown). The heating chamber 3 is attached to the frame 1 by securing means such as bolts 9.

The inner tube 6 is supported on a movable member 10 fitting in a slide or seat 11 formed in the lower bifurcation of the frame 1. The member 10 is supported by a sliding rod 12 which in turn is movable longitudinally by a screw 14 working in a bearing 15 threaded into an opening 16 in an extension 17 of the frame 1. The screw 14 carries a handwheel 18 through the medium of a pin 19.

For applying a uniform pressure to the inner tube 6, the top of the member 10 is provided with a depression 20 which is covered by a flexible material or pad 21, such as stiff rubber. The edges of the pad 21 fit in seats 22 in the member 10. The shape of the depression 20 preferably substantially corresponds to the shape of the material 5 being vulcanized to the inner tube or the like. The passageway 24 extends from the depression 20 and is provided with threads 25 for engaging a nipple 26 which is connected to a flexible pipe line or the like 27 controlled by valves (not shown). Upon the admission of fluid to the pipe line 27, the pad 21 is placed under a uniform pressure, which uniform pressure is transmitted to all parts of the vulcanizing area. The amount of such pressure per unit of area is controlled by the pressure of the fluid supplied.

Where valve bases are being vulcanized to inner tubes, the lower face 4 of the chamber 3 is provided with a dowel pin 28 which centers the valve base and maintains an opening for the valve stem.

In the operation of the vulcanizing device, the inner tube 6 and valve base 5 are prepared by buffing and cementing at the valve base zone. The adhesion of the cement retains them in a temporarily fixed relation. The tube and base are placed in position in the vulcanizing device and the tube is adjusted so that the valve hole in the base aligns with the dowel pin 28. The hand wheel 18 is operated for raising the member 10 which holds the tube and base firmly against the steam chamber box 3. Generally, steam continuously circulates through the chamber 3 and is shut off when the device is not intended to be used for an extended period. The compression obtained by the hand wheel 18 causes the pad 21 to seal with the member 10 and thus seal the depression 20 from the atmosphere. Fluid is admitted to the depression 20 through the pipe line 27 which reacts with the pad 21 to cause the latter to exert a uniform pressure against the area of the material 5. The absolute pressure exerted is controlled by the pressure of the fluid admitted.

After the vulcanizing period, the fluid pressure in the depression 20 is relieved, the handwheel 18 is actuated to lower the member 10, and the tube is removed from the apparatus.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. In vulcanizing apparatus, a clamping member comprising a movable member having a recess at a face adjacent material to be vulcanized, and a flat flexible cover for said recess, means for supplying fluid under pressure behind the cover, and a supporting rod for said member.

2. A vulcanizing device comprising an upper member having a shape conforming to the shape of a patch or the like, a lower member having a recess substantially conforming in shape to said patch, and a flexible cover for said recess seated therein.

3. A vulcanizing device having a material engaging member of the general shape of a patch or the like, said member having provision for circulating a heating fluid, a second member having a recess therein conforming to the general shape of said patch, a flexible cover for said recess seated therein, and means for applying pressure to said flexible cover for uniformly pressing material into engagement with the first named member.

4. A vulcanizing device comprising a frame having bifurcated arms, a heating chamber and material engaging member supported by one arm and a movable clamping jaw supported by the other member, said jaw having a recess and a flexible cover therefor which engage material being vulcanized for applying a uniform pressure thereover.

5. A vulcanizing device comprising an arm, a seat in said arm, a material engaging member having side skirts fitted in said seat and slidable therein, and means for adjusting the position of said member in said seat.

Signed at Detroit, county of Wayne, State of Michigan, this 25th day of April, 1930.

GEORGE K. McNEILL.